United States Patent [19]

Edwards

[11] Patent Number: 4,942,510
[45] Date of Patent: Jul. 17, 1990

[54] POWER AND SIGNAL TRANSFER INTERFACE CIRCUIT

[75] Inventor: Arthur J. Edwards, Hoffman Estates, Ill.

[73] Assignee: Motorola, Inc., Schaumburg, Ill.

[21] Appl. No.: 445,877

[22] Filed: Dec. 4, 1989

[51] Int. Cl.$^5$ .................... H02M 7/217; B60C 23/00
[52] U.S. Cl. ............................ 363/127; 340/448; 340/643; 73/146.4; 73/146.5; 363/89
[58] Field of Search ............... 363/89, 126, 127; 323/289, 282, 285; 340/448, 643; 73/146.4, 146.5

[56] References Cited

U.S. PATENT DOCUMENTS

| | | | |
|---|---|---|---|
| 2,953,738 | 9/1960 | Bright | 363/127 |
| 3,582,758 | 6/1971 | Gunn | 363/127 |
| 4,323,962 | 4/1982 | Steigerwald | 363/127 |
| 4,467,641 | 8/1984 | Abraham | 73/146.5 |
| 4,672,527 | 6/1987 | Lagadez et al. | 363/89 |
| 4,683,415 | 7/1987 | Zimmerman | 363/89 |
| 4,716,514 | 12/1987 | Patel | 363/127 |
| 4,737,761 | 4/1988 | Dosjoub et al. | 340/448 |
| 4,806,843 | 2/1989 | Mertens et al. | 363/89 |

*Primary Examiner*—Peter S. Wong

[57] ABSTRACT

An interface circuit serves to rectify excitation energy inductively coupled to a transistor acting in a diode configuration to charge a reservoir capacitor which may then serve as a power source. Switch means under the control of an external functional circuit block is arranged to bias the transistor into a reverse operating mode to itself act as a switch to discharge energy from the reservoir into the coupling. In this way pulses may be back coupled to be detected at the excitation source. The timing of the back coupled pulses may be information bearing.

9 Claims, 1 Drawing Sheet

POWER AND SIGNAL TRANSFER INTERFACE CIRCUIT

TECHNICAL FIELD

The present invention relates to interface circuits, that is circuits arranged to provide a signal path between other functional circuit blocks.

BACKGROUND OF THE INVENTION

In an automotive application, for example, an interface may be required between a sensor block detecting tire pressure and temperature mounted on a wheel and a signal conditioning block mounted on a vehicle for ultimate display of pressure and temperature to a driver. In this example of a rotating wheel, since direct connection is impossible, it is apparent that the signal interface between functional block must be via a coupled path. Hence, the wheel mounted interface circuit must provide the drive for such coupling. Also in such a remote sensing operation energy will be required to power the sensors and hence it is desirable that an energy transfer path is provided if the use (and thereby the replacement) of batteries is to be avoided.

U.S. Pat. No.4,737,761 issued to Dosjoub, describes a system wherein a transmission path is provided by two coils and inductive coupling therebetween. In one arrangement, a single path is used both for power transfer to a sensor block by transformer action and for return transmission of sensor related signals by means of coupled times pulses. Dosjoub provides an interface circuit comprising a four diode bridge rectifier arranged to charge a capacitor to provide a power supply for a sensor block. Dosjoub further provides means in the form of additional components connected across one of the bridge limbs for discharging a capacitor into the wheel mounted coil to cause a return pulse to the stationary coil, the timing of the pulses being the information content of the signal.

In such a remote sensing arrangement, it is desirable that power consumption at the sensing end be minimized. Integration of an interface circuit would achieve this, particularly if sensor block components were integrated in the same device; integration implies lower power consumption since the distances between circuit components is minimized. Integration also provides a physically small arrangement, which is advantageous in space critical applications, including a wheel mounted block.

SUMMARY OF THE INVENTION

According to the present invention, an interface circuit for providing a power source for a functional circuit block from coupled alternating excitation source and return transmission path from said block to said source comprises:
a transistor
associated switch means, and
energy storage means,
said transistor having a forward mode of operation, wherein it serves to rectify forwardly coupled excitation energy to thereby charge said energy storage means as said power source, and
a reverse mode of operation wherein energy stored in said cahrge means is discharged to provide a back coupled pulse,
said switch means being adapted to cooperate with said functional circuit block to controllably activate said reverse mode to provide said return transmission.

In a preferred form of the present invention, the transistor is connected to a coil which is inductively coupled to rectify, in the forward mode, by diode action and charge an energy storage capacitor. In the reverse mode, the base is driven such that the resistor acts in a switch mode to connect the capicitor across the coil to thereby induce a pulse in the normally exciting coil. In this reverse mode the transistor functions with its emitter acting as collector and its collector acting as emitter. Preferably, the coil is arranged so that the back coupling is sustained by self-resonance. Advantageously the switch means driving the transistor is a further transistor arranged as a switch, receiving control signals from the functional circuit block.

For preference, the transistor is integrated lateral PNP type, having a high reverse gain.

In a yet further preferred form of the present invention, a clamping zener diode referenced to supply ground is employed to clamp the negative going potion of the back coupled pulse to a predetermined level.

BRIEF DESCRIPTION OF THE DRAWINGS

In order that features and advantages of the present invention may be further appreciated, an embodiment will now be described with reference to the accompanying diagrammatic drawings of which.

BEST MODE FOR CARRYING OUT THE INVENTION

Figure 1:
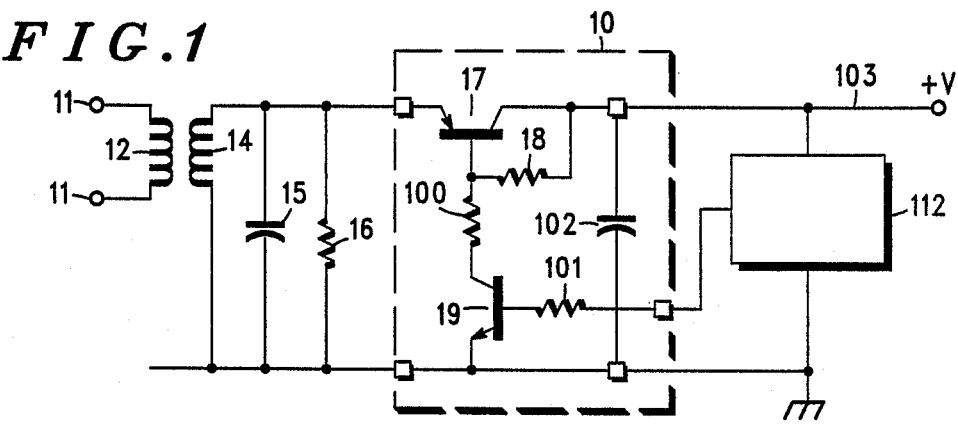
FIG. 1 represents an interface circuit in accordance with the present invention connected between a transmission path and a functional circuit block.

An interface circuit 10 provides an interface between an excitation source (not shown) and a functional circuit block 112 (FIG. 1). The excitation source is connected to terminals 11 to provide an alternating current through a coil 12 which is inductively coupled to a coil 14. In the tire application already discussed, coil 12 would be stationery on a vehicle and coil 14 wheel mounted. The voltage appearing at the output of the coil is connected to a transistor 17 which has an associated bias resistor 18. The base of the transistor 17 is also driven by a switching transistor 19 in accordance with a signal appearing at its base via resistor 101. Transistor 19 drives transistor 17 via base resistor 100 as is described in greater detail below. The output at the collector of transistor 17 serves to charge an electrolytic capacitor 102 which acts as energy storage means to supply a voltage (+V) on line 103 to which the power supply connection of the functional circuit block 112 is made. Hence, a power supply is available for the functional circuit block 112 between positive line 103 and ground. The functional circuit block 112 provides an output connected to resistor 101 to drive the switching transistor 19.

The functional circuit block may, for example, be of the form shown in U.S. Pat. No.4,703,650 to Dosjoub which provides a timed pulse output signal, conveying information about, for example, tire air pressure and temperature. The transmission path formed by the inductively coupled coils 12 and 14 and their associated components may be, for example, of the form shown in the previously referenced U.S. Pat. No4,737,761, being respectively mounted on a vehicle chassis and wheel. The operation of the present embodiment as thus far described will no be considered in more detail.

Figure 2A:
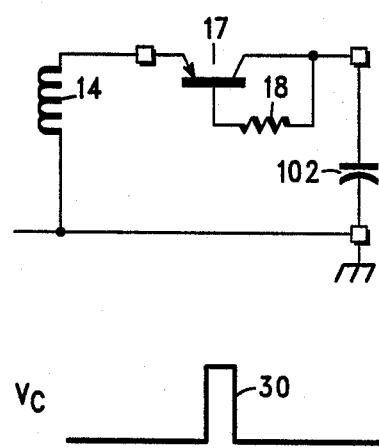
FIG. 2(a) represents an equivalent circuit of the interface circuit of FIG. 1 in its first mode of operation.
Figure 2B:
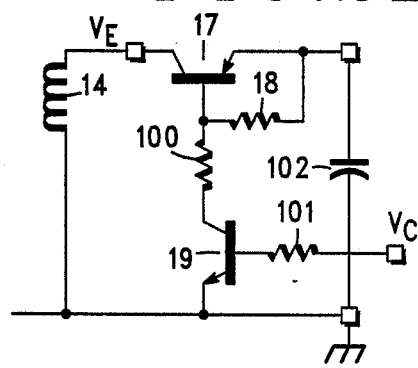
FIG. 2(b) represents an equivalent circuit of the interface circuit of FIG. 1 in its second mode of operation.

If functional circuit block 112 produces an output which has positive going pulse when no such pulse is present, transistor 19 will be held off by the absence of voltage at its base via resistor 101 which means that in this forward mode of operation transistor 19 and resistor 100 may be ignored. This results in the transistor 17 (FIG. 2A) being connected in a diode configuration wherein it will act as a rectifier to charge capacitor 102 in response to AC excitation of the coil 14. Operation as a diode will be maintained as long as the voltage at the emitter terminal exceeds that at the collector terminal sufficiently for resistor 18 to provide base current. Essentially, the arrangement is that of a single diode half wave rectifier. Although the presence of resistor 18 is a departure from the classical diode connection wherein the base and the collector of transistor 17 would be short circuited, the performance of the arrangement is adequate provided the value of the resistor 18 is not too great. The interface circuit thus operates in its forward mode to charge the power supply capacitor 102 when the input applied to transistor 19 via resistor 101 is low.

When the inpupt applied to the base of transistor 19 via resistor 101 is high, it will turn on and the base of the transistor 17 is pulled below the value to which the power supply capacitor 102 has charged. Once the voltage developed across the resistor 18 exceeds a junction base emitter voltage, transistor action will occur in a reverse mode of operation, with the normal collector acting as emitter and the normal emitter acting as a collector. Eventually, the transistor 17 will turn on as a switch in this reverse mode to allow current flow to ground out of the power supply capacitor 102 via the coupling coil 14.

Figure 3:
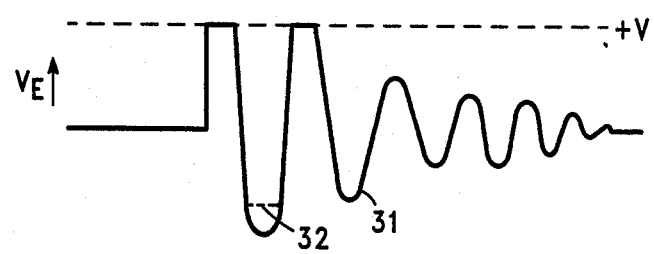
FIG. 3 is a timing diagram of waveforms at points in the circuit of FIG. 1 during back coupling.

It will be recalled that an PNP transistor is essentially a symmetrical structure, and that a fair degree of reverse current gain is inevitably demonstrated by such a device. The present invention exploits this behavior to allow a controllable current to be inserted into the coil 14 by applying a switching voltage via resistor 101 to the transistor 19. Where the control voltage (VC) applied to the transistor 19 is a short duration pulse, this mechanism may be used to back transmit a signal via the coil 14. When the control voltage VC is pulsed (30, FIG. 3), the output voltage VE appearing at the emitter terminal for the transistor 17 will follow the positive going edge of pulse 30. When the pulse is removed, the system will try to maintain the current through the coil 14 and hence a negative going voltage will be established at the non-grounded end of the coil, of a magnitude much greater than the initial voltage swing, due to the resonance of the components (assisted by capacitor 15 and resistor 16). As the signal decays, the positive going voltage will be clamped by the diode action of the transistor 17 acting in the froward mode. Eventually, the voltage appearing at the emitter terminal 31 will decay away to 0. The proximity of coil 12 to the charging flux pattern caused by this oscillatory current will induce a variation therein. Thus, a pulse has been back transmitted which may be detected at the terminals 11 of the coil 12 acting as a receiver. It will be appreciated that in practice the decaying resonant pulse voltage will be superimposed on any excitation voltage applied to the terminals 11 by the excitation source, although there may be none since cessation of excitation is a convenient way of requesting transmission.

It will be further appreciated that the arrangement of the interface circuit in accordance with the present invention provides a structure that may be straightforwardly integrated. In particular, transistors 17 and 19 and resistors 18, 100 and 101, as well as possible capacitor 15 and resistor 16 may all be integrated devices.

Where integration is used, the PNP transistor is likely to be a lateral device, that is a device having its emitter and collector made of the same diffusiion into a substrated with merely their geometry determining which preferentially acts as emitter and which as collector. Typically, a ring structure will be employed with an annulus of base material separating the common emitter and collector diffusions. The common doping profiles for the emitter-base and the collector-base junctions mean that it is normal for such a construction to provide a significant reverse gain. Typically, reverse gain is less than the forward gain by a factor of about 5. For a bipolar device a forward gain of 200 would be typical, giving a reverse gain around 40 which is still adequate for the short duration current pulse to be injected into coil 14 by the transisitor 17 acting in reverse.

The gain allows a conveniently high value for the resistor 18 due to the significant current gain of the transistor 17 operating in the diode configuration, since little base current is recquired. For example, then if the current is 10 milliamps, then only 0.5 milliamps of base current is needed at a forward gain of 200, selecting the value of resistor 18 to give a low voltage drop at this current, for example, 0.2 volts, giving an overall diode forward voltage of 0.9 volts, then the value of the 100 then needs only to be small enough to overcome the reistance of resistor 18.

In an alternative form of the present invention, the resistor 18 could be replaced with an active switch. A special configuration of lateral PNP transistor giving a high degree of symmetry would be advantageous so that the forward and reverse gains were substantially identical, alternatively two PNP transistors in inverse parallel could be employed.

It will be appreciated that the present invention provides a robust structure, even without voltage clamping protection devices. Although there is a relatively large negative going voltage present when the transistor 19 is turned off at the end of the pulse 30, since a P diffusion is involved, there is no risk of carrier injection into the substrate of the integrated device. However, it may still be desirable to limit the negative going voltage since if it is of a constant amplitude, the voltage coupled back into coil 12 acting as a receiving will be well defined. Also, there will be no risk of transistor 17 sustaining a breakdown voltage which might potentially damage it.

Figure 4:
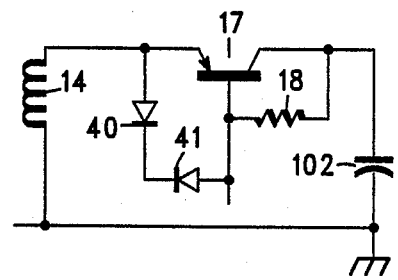
FIG. 4 shows a first arrangement for clamping.

In one arrangement to provide voltage clamping (FIG. 4) a zener diode 40 and an associated forward blocking capacitor 41 allows the transistor 17 itself to clamp the negative going transients. As is advantageous in integration, this allows the zener diode 40 to be a very small device, since it is the transistor that absorbs the energy. Moreover, the voltage clamped is exactly the reverse emitter base junction voltage, e so that a suitable diode 40 may be straightforwardly selected to insure the protection of transistor 17. Unfortunately, any clamp energy required will be withdrawn from the power supply reservoir capacitor 102, but it is unlikely that this will be significant. Also, when the transistor 17 is acting in the forward mode, any negative half cycles causing the transistor to conduct via the diode path 40 and 41 will reduce the energy stored in the reservoir capacitor 102.

Figure 5:
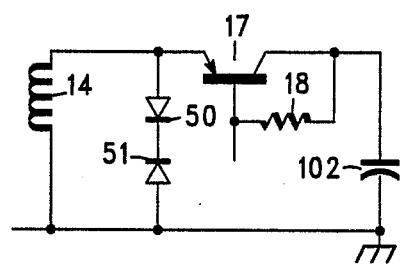
FIG. 5 shows a second arrangement for clamping.

In an alternative arrangement (FIG. 5), a zener diode 50 and a forward blocking capacitor 51 are again used but in this arrangement the negative transients are clamped to the common line and therefore do not extract energy from the reservoir capacitor either during clamping or during forward mode operation. Care must be taken to insure that the voltage appearing across zener diode 50 at its breakdown pulse the reservoir capacitor voltage 102 are less in total than the breakdown voltage of the transistor 17. Since the reservoir capacitor voltage 102 will normally itself be clamped, it is straightforwardly possible to select a value for the zener diode 50 which will adequately protect the transistor 17. Whichever clamping arrangement is employed, it will be remembered that in practice the zener diode will be a series connected assembly of junctions summing to give the required total voltage. The effect of clamping is shown by a portion 32 of curve 31.

It will be appreciated that the present invention provides an arrangement which is advantageous for integratioin compared, for example, with the arrangement shown in U.S. Pat. No. 4,737,761. In particular, both rectification and back transmission are provided with a single device, as compared with six devices required in the reference system. This has the advantage of saving silicon area in integration. Evne if a full wave rectified version of the present invention were configured, a single device could still act as one of the bridge limbs and the re-transmission arrangement.

It will further be appreciated that the reservoir capacitor 102 is charged at all times, except when transistor 19 is pulsed for back transmission. Hence, there is no need for a disconnecting component as suggested by Dosjoub in U.S. Pat. No. 4,737,761.

What is claimed is:

1. An interface circuit for providing a power source to a functional circuit block from a coupled alternating excitation source and a return transmission path from said block to said source comprising:
   a transistor,
   associated switch means, and
   energy storage means,
   said transistor having a forward mode of operation, wherein it serves to rectify forwardly coupled excitation energy to thereby charge said energy storage means as said power source, and
   a reverse mode of operation wherein energy stored in said storage means is discharged to provide a back coupled pulse,
   said switch means being adapted to cooperate with said functional circuit block to controllably activate said reverse mode to provide said return transmission.

2. An interfaced circuit as claimed in claim 1 and wherein said excitation source is inductively coupled.

3. An interface circuit as claimed in claim 2 and wherein said transistor acts as a switch in said reverse mode to discharge energy from said energy storage means into said inductive coupling.

4. An interface circuit as claimed in claim 1 and wherein said switch means is a further transistor acting as a switch.

5. An interface circuit as claimed in claim 1 and wherein said transistor is a lateral PNP type.

6. An interface circuit as claimed in claim 1 and including a zener diode referenced to supply ground and arranged to clamp the negative going portion of back couled pulses.

7. An interface circuit as claimed in claim 1 and including an active switch arranged to configure said transistor as a diode in said forward mode.

8. An interface circuit as claimed in claim 1, and wherein said transistor is arranged to have substantially equal forward and reverse gain.

9. An interface circuit as claimed in claim 1 in integrated circuit form.

* * * * *